United States Patent [19]

Watkinson et al.

[11] Patent Number: 5,017,207
[45] Date of Patent: May 21, 1991

[54] METHOD AND APPARATUS FOR FORMING GLASS FLAKES

[76] Inventors: Charles J. Watkinson, 331 Leeds Road, Scholes Leeds, England, LS15 4DF; John H. Elvidge, Applegarth, 303 High St., West Yorkshire, England, LS23 6AL

[21] Appl. No.: 424,262

[22] PCT Filed: Apr. 22, 1988

[86] PCT No.: PCT/GB88/00314
§ 371 Date: Dec. 21, 1989
§ 102(e) Date: Dec. 21, 1989

[87] PCT Pub. No.: WO88/08412
PCT Pub. Date: Nov. 3, 1988

[30] Foreign Application Priority Data

Apr. 23, 1987 [GB] United Kingdom ............... 8709608

[51] Int. Cl.$^5$ ............................................. C03B 37/00
[52] U.S. Cl. ............................................. 65/66; 65/6; 65/14; 65/60.1; 65/141; 264/5; 264/7; 264/8; 425/6; 425/8
[58] Field of Search ............ 65/6, 14, 16, 15, 28, 65/35, 60.1, 66, 141, DIG. 3; 425/6, 8; 264/5, 7, 8

[56] References Cited

U.S. PATENT DOCUMENTS

| | | |
|---|---|---|
| 2,156,982 | 5/1939 | Harford et al. |
| 2,338,473 | 1/1944 | von Pazsiczky |
| 3,257,183 | 6/1966 | Slayter et al. ............ 65/6 |
| 3,325,263 | 6/1967 | Day et al. ............ 65/141 X |
| 3,346,356 | 10/1967 | Anderson et al. ............ 65/6 X |
| 3,607,165 | 9/1971 | Guthrie ............ 65/15 X |
| 3,644,108 | 2/1972 | Russell ............ 65/15 X |
| 3,883,334 | 5/1975 | Cassidy et al. ............ 65/6 X |

FOREIGN PATENT DOCUMENTS 0169952 5/1986 European Pat. Off.
989671 4/1965 United Kingdom.

Primary Examiner—Robert L. Lindsay
Attorney, Agent, or Firm—Darby & Darby

[57] ABSTRACT

Flakes of glass, basalt or other frangible material are formed by feeding a stream of the molten material in a downwards direction into a rotating cup (5) which has its open mouth facing upwardly with its rim disposed at a horizontal level between a pair of spaced apart parallel plates (9 and 11) which are mounted within a vacuum chamber (13) in such manner that, as air is drawn from outside the chamber (13) between the plates (9 and 11) the molten material is drawn radially outwardly without touching the plates and is cooled with the continuing outward movement causing the material to be broken into flakes.

11 Claims, 1 Drawing Sheet

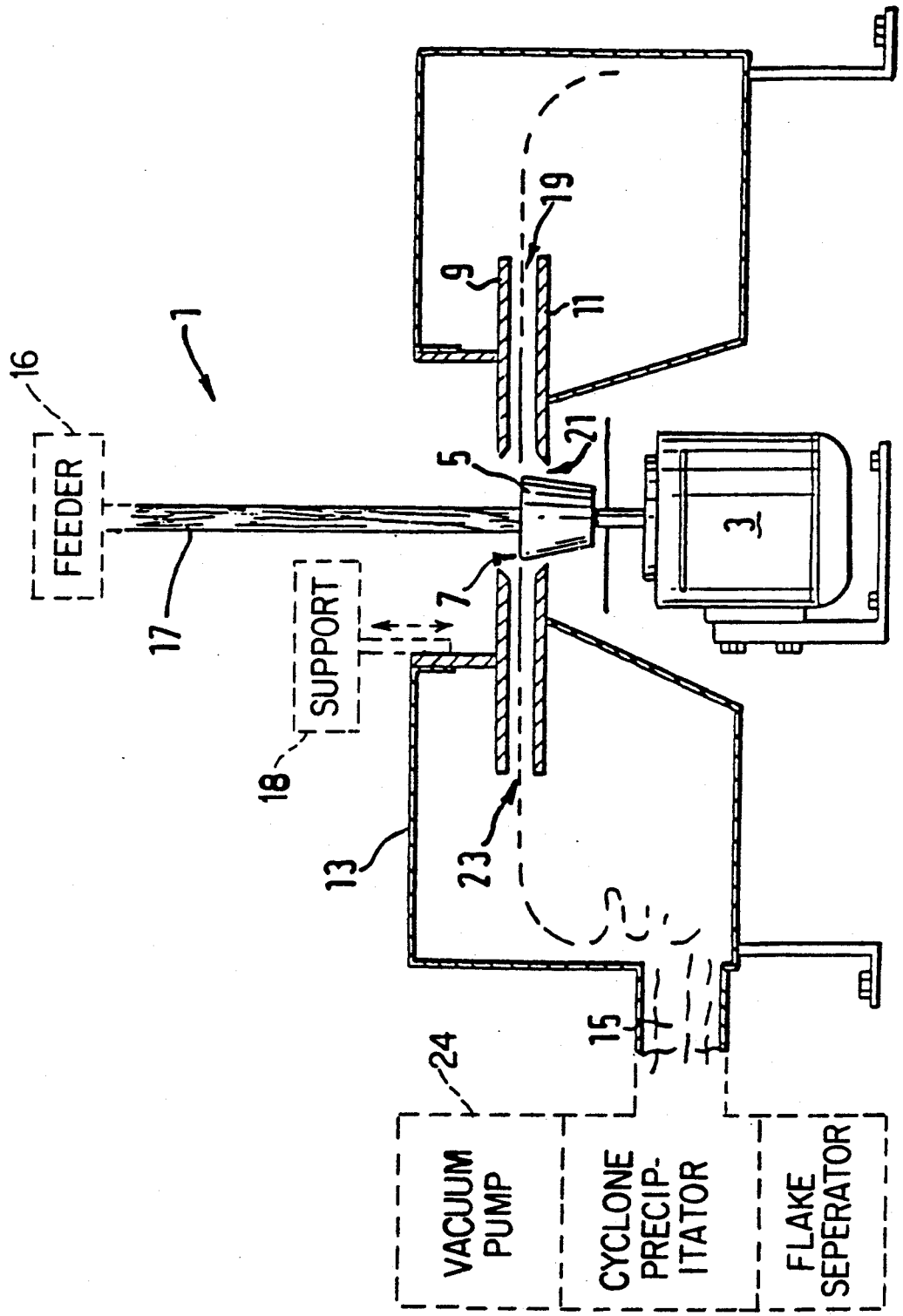

METHOD AND APPARATUS FOR FORMING GLASS FLAKES

FIELD OF THE INVENTION

The invention relates to a method and apparatus for forming flakes of glass or flakes of other like material.

The method and apparatus are applicable equally to any material which would melt when heated and is capable of being formed into flakes. Flakes of glass and similar materials are increasingly being used for the reinforcement of plastics or other composite materials.

One method which has been employed in the past to form flakes of glass has involved forming a thin walled cylinder of molten glass and then collapsing the cylinder to fracture the glass film to form glass flakes. The glass flakes produced by such a method are not flat or planar, and thus are undesirable for those many purposes which comtemplate use of flat or planar flakes.

A method and apparatus for forming flakes of glass was disclosed in UK Patent Specification No. 989,671. This method is one in which the stream of heat softened material is fed vertically downwardly to a rotating distributor which throws out the heat softened material onto the walls of a downwardly facing annular cup. The cup forms part of a rotor which rotates at high speed and therefore gravity and centrifugal force cause the material to flow downwardly along the inner walls of the cup and then out from the bottom rim of the cup. This projects the material outwardly in the form of a film and this film is then broken up into flakes. It is suggested that the film can be broken up into flakes by mechanical means and the specification also described a method of breaking the film into flakes by blowing gas at high pressure in a direction so that it cuts through the film to break it up into flakes. This method and apparatus system has now been used for a number of years but it involves complex arrangements of heating and cooling means about the rotor and its surroundings. Moreover the glass flakes produced are often inconsistent in size and thickness.

SUMMARY OF THE INVENTION

According to the invention there is provided apparatus for forming flakes of material from a heated stream of molten material comprising means for feeding the stream in a downwardly direction into a rotating cup, the cup being arranged such that its opened mouth faces upwardly such that molten material within the cup is caused to flow over the upper edges of the cup and then flow outwardly in a radial direction due to centrifugal force, characterised in that the apparatus also includes a pair of spaced apart substantially parallel plates arranged about the cup such that the material leaving the cup by centrifugal force passes through a gap defined between the plates, the plates being mounted within a cyclone vacuum chamber arranged such that a vacuum is applied to the space between the plates to draw air from outside the chamber between the plates in a radial direction to prevent the molten material from touching the sides of the plate and to cool material until it reaches a solid state, and thereby pulling the material in a radial direction, keeping the material in a flat film and breaking it into small platelets.

Thus the molten material fed between the plate is prevented from rolling or rucking over.

Preferably the plates are in the form of two annular plates with cup mounted such that its rim lies between the plates.

Preferably the vacuum chamber is connected via its outlet to a cyclone precipitator separator and vacuum pump.

By suitable choice of speed of rotation of the cup, the distance between the two plates and choice of air flow through the vacuum chamber, the size and thickness of the flakes of material to be produced can be controlled.

Preferably the cup has tapered sides so that its top edge flares outwardly so that the passage of the molten material up the sides of the cup is aided by centrifugal force.

The apparatus can be used to produce flakes of many different materials which can be molten. Typically this material will be glass but the apparatus may equally be used with materials such as basalt, ceramics such as alumina, graphite, and metals such as lead.

For each different material different parameters of speed of rotation of cup, temperature of molten material, volume of molten material, gap between the plates, and airflow between the plates will be different. It is preferred therefore that the apparatus includes means to vary many of these parameters as possible.

It is therefore preferred that the cup is attached to a variable speed electric motor which allows the speed of rotation to be varied readily.

Preferably at least one of the plates is mounted so that it can be moved towards or away from the other. Clearly by varying the distance between the plates this will also have an effect on the speed of airflow between them.

The speed of airflow can also be varied by varying the vacuum pull applied to the cyclone vacuum chamber.

The produced flakes can be treated by coating with suitable bonding agents or other chemicals by injecting an adhesion promotor or chemical either as the material leaves the cup or as it leaves the gap between the two plates.

It should be noted that the diameter of the plates will also have an effect on the flake size and thickness to be produced and this also will have to be carefully chosen.

The variable parameters can be varied within wide ranges and all have an inter-relation to each other. When the material to be used is chosen, it will be readily apparent to the skilled addressee of the specification as to how to vary the parameters to produce flakes of required size and thickness.

Once the parameters for a particular material type and flake size are established the apparatus will produce that material constantly within very fine dimensional limits.

Thus, the method in accordance with the invention consists of feeding a stream of molten material in a downwardly direction into a rotating cup; allowing the material to pass over the edge of the cup to be forced through a pair of plates surrounding the cup in a radial direction by a flow of air passing between the plates to pull the stream of material in a radial direction to keep it flat and also to pull it to form flakes to be fed from a vacuum chamber to a collection point.

BRIEF DESCRIPTION OF THE DRAWINGS

A method and apparatus for forming flakes of material from a stream of molten material will now be described by way of example only with reference to the accompanying drawing which is a schematic section through the apparatus.

DESCRIPTION OF THE PREFERRED EMBODIMENT

Apparatus 1 for manufacturing flaked material from a stream of molten material consists of a variable speed electric motor 3 mounted vertically to which is attached a tapered upwardly open, rotatable, centrifuge type cup 5 that flares upwardly and outwardly to define an upwardly and outwardly flaring top edge or rim 7.

The rim 7 of the cup 5 lies between two generally horizontal parallel, centrally apertured, annular extraction plates 9, 11, the upper one 9 of which is adjustable for movement toward and away from the lower plate 11 by a variable position mounting support 18 (in the direction of the arrow as shown in the drawing). The two plates 9, 11 are mounted at their outer peripheries in a chamber opening so as to locate the plates within a cyclone vacuum chamber 13 which is connected via the outlet connection 15 to a cyclone precipitator, flake separator and vacuum pump arrangement 24 (shown schematically in the drawing), for generating a reduced pressure within chamber 13 and for collecting the produced flakes.

The method of operation is as follows. The cup 5 is rotated at speed and the stream 17 in this case of glass, is allowed to enter from above via a feeder 16 (shown schematically in the drawing) at a given flow rate. Centrifugal force distributes the glass evenly within the cup and pushes the glass outwardly over the cup rim 7.

The vacuum is applied to the cyclone vacuum chamber 13 via the outlet connection 15. Air enters this chamber via the gap 19 between the annular extraction plates 9 and 11 at a point 21 on the lower plate 11 and a corresponding location on the upper plate 9.

The entering air has a dual effect on the process. The air rapidly cools the centrifuge cup 5 and the glass leaving the cup 5 at the rim 7.

The glass leaving the centrifuge cup 5 at rim 7 is located within the gap and prevented from touching the sides of the annular plates 9 and 11 by the air flow.

The air flow continues to cool the glass until it reaches a solid state, and due to friction upon the glass, continues to pull 14 in a radial direction, thus preventing the glass from rolling or rucking over, keeping the glass flat and breaking it into small platelets.

The platelets are collected in the cyclone vacuum chamber 13 and exit via connection 15 to the precipitator cyclone and flake separator, formed as filter section, of arrangement 24.

The size (loosely described as the diameter of platelet or flake) and the thickness of flake can be varied through a considerable range by adjusting the flow of glass into the cup 5, adjusting the speed of rotation of the cup 5, adjusting the distance between the annular extraction plates 9 and 11, for example, by means of the variable position mounting support 18, and varying the vacuum pull or velocity through the gap 19 between the annular extraction plates for any given gap by varying the amount of air flow through the extraction connection 15. Thus, a range of materials can be manufactured on this equipment both in diameter and thickness without recourse to further grading, crushing or grinding operations.

The product produced is taken through the stages of manufacturing to packaging without being exposed to the atmosphere external to the equipment, i.e. save for air intake at point 21 into gap 19.

Treatment of the flakes produced by coating with suitable bonding agents or other chemicals, can easily be made by injecting such adhesion promotor or chemical at point 23, or other suitable location such as point 21 within the air flow.

A glass stream of low temperature can be extruded by the air flow through the gap 19 with considerable force, pulling it extremely thin even at low temperature. Alternately the gap 19 can be increased and the speed of the centrifuge cup 5 increased to give different parameters for the production of flake.

Because the variables are wide, e.g. the volume of molten stream entering centrifuge cup 5, the temperature of that material, the speed of centrifuge cup 5, the diameter of centrifuge cup 5, the gap at 19, the distance between 7 and 23, and the air flow at 15, the process lends itself to manufacture of flake of various sizes from many different materials with varying viscosities and melting points.

Once the parameters for a particular material type and flake size are established, the apparatus will produce that material constantly within very fine dimensional limits.

We claim:

1. Apparatus for forming flakes of frangible material from a heated stream of molten material, which comprises
   (a) a cup having an open mouth defined by an edge and which faces upwardly,
   (b) means for rotating the cup so that molten material supplied to the cup is caused to flow upwardly over said edge of the cup and radially outwardly therefrom under centrifugal force,
   (c) a chamber having an opening through which the material and external air can enter the chamber, the opening being positioned adjacent said edge of the cup,
   (d) means for generating reduced pressure within the chamber, and
   (e) a pair of spaced apart substantially parallel plates defining a gap therebetween, positioned relative to the cup and to the chamber opening so that molten material flowing outwardly from the edge of the cup and external air are drawn through the gap between the plates without the molten material touching the plates and in turn so that the molten material and air are drawn via the gap into the chamber through the opening under a pressure differential induced by the means for generating reduced pressure.

2. Apparatus of claim 1 wherein the chamber is a cyclone vacuum chamber.

3. Apparatus of claim 1 wherein the plates are two annular plates and the cup is mounted so that its edge lies between the two plates.

4. Apparatus of claim 3 wherein the chamber is connected via a chamber outlet to a cyclone precipitator/separator and a vacuum pump.

5. Apparatus of claim 1 wherein the cup has tapered sides and its top edge flares outwardly.

6. Apparatus of claim 1 including a variable speed electric motor for rotating the cup.

7. Apparatus of claim 1 including support means for mounting at least one of the plates for movement toward and away from the other of the plates.

8. Apparatus for forming flakes of frangible material from a heated stream of molten material capable of forming such flakes upon cooling the material to solid state, which comprises means for feeding the stream in a downward direction, an upwardly open cup having a top edge, means for rotating the cup, a chamber having an inlet opening, means for generating a vacuum in the chamber, and a pair of substantially parallel plates spaced apart to form a gap therebetween and correspondingly having a pair of central apertures and outer peripheries, the cup being rotatably arranged beneath the feeding means to receive the downward stream during rotation, and the plates being arranged with their peripheries in the chamber opening and their central apertures located about the cup to define an external air inlet thereat, whereby molten material within the rotating cup is caused to flow upwardly over the top edge and radially outwardly under centrifugal force, such that when a vacuum is generated in the chamber the material flowing outwardly from the cup passes through the gap between the plates, while air from outside the chamber is simultaneously drawn into the air inlet and radially outwardly in the gap between the plates to prevent the molten material from touching the plates, to cool the material until it reaches solid state, and to pull the material radially outwardly, thereby keeping the material in the form of a flat film and in turn breaking the solid state material into small platelets.

9. A method of forming flakes of frangible material from a heated stream of molten material, which comprises (a) supplying a heated stream of molten material which is capable of forming frangible flakes upon cooling from molten to solid state, in a downward direction into a cup having an open mouth defined by an edge and which faces upwardly, (b) simultaneously rotating the upwardly facing cup to cause the stream of molten material to flow upwardly over the edge of the cup and radially outwardly therefrom under centrifugal force, (c) subjecting the outwardly flowing molten material to a flow of air radially outwardly in a gap defined between a pair of substantially parallel plates to direct the flow of molten material radially outwardly between the plates without touching the plates for solidifying the molten material, the flow of air being sufficient to maintain the molten material flat and to pull the molten material radially outwardly between the plates as it solidifies, and (d) breaking the flat solidified material into flakes by continued subjecting of the solidified material to the flow of air radially outwardly between the plates.

10. Method of claim 9 wherein the flakes are treated by coating with an additive either as the material leaves the cup or as it leaves the gap between the two plates.

11. Method of claim 9 wherein the material is glass, basalt, ceramic, graphite or metal material, which is capable of becoming molten when heated and of forming frangible flakes upon cooling to solid state.

* * * * *